United States Patent [19]

Cappellato

[11] Patent Number: 4,976,335

[45] Date of Patent: Dec. 11, 1990

[54] SYSTEM FOR LUBRICATING MECHANICAL MEMBERS, IN PARTICULAR AIRCRAFT COMPONENTS, FEATURING A MINIMUM EMERGENCY OIL SUPPLY DEVICE

[75] Inventor: Bruno Cappellato, Turin, Italy

[73] Assignee: Fiat Aviazione S.p.A., Italy

[21] Appl. No.: 478,635

[22] Filed: Feb. 13, 1990

[30] Foreign Application Priority Data

Feb. 14, 1989 [IT]  Italy ............................. 67088 A/89

[51] Int. Cl.⁵ .............................................. F01M 1/18
[52] U.S. Cl. ...................................... 184/6.4; 184/7.4
[58] Field of Search .................. 184/6.4, 6.1, 7.4, 108, 184/6.11; 60/39.01, 39.091

[56] References Cited

U.S. PATENT DOCUMENTS

| | | | |
|---|---|---|---|
| 2,871,981 | 2/1959 | Baits ....................................... | 184/6.4 |
| 4,284,174 | 8/1981 | Salvana et al. ........................ | 184/6.4 |
| 4,424,665 | 1/1984 | Guest et al. .......................... | 184/6.11 |
| 4,891,934 | 1/1990 | Huelster ............................... | 184/6.4 |

FOREIGN PATENT DOCUMENTS 0375443  5/1973  U.S.S.R. ............................... 184/6.4

Primary Examiner—Ira S. Lazarus
Assistant Examiner—Alan B. Cariaso
Attorney, Agent, or Firm—Kane, Dalsimer, Sullivan, Kurucz, Levy, Eisele and Richard

[57] ABSTRACT

A system for lubricating aircraft mechanical members, comprising a main circuit and an emergency device; the main circuit comprising a main pump for sucking up lubricating oil from a main tank and connected by a delivery pipe to a number of oil supply nozzles; a number of oil recovery pumps; and a pipe for recirculating the oil to the main tank; and the emergency device comprising an auxiliary pump for sucking up oil from a storage tank series-connected to the delivery pipe; and a pair of monostable, hydraulically controlled valves respectively connecting the recovery pumps and auxiliary pump to the recirculating pipe and storage tank under normal operating conditions, and to the storage tank and an auxiliary delivery pipe to the nozzles in the event of a breakdown on the main circuit.

12 Claims, 3 Drawing Sheets

4,976,335

SYSTEM FOR LUBRICATING MECHANICAL MEMBERS, IN PARTICULAR AIRCRAFT COMPONENTS, FEATURING A MINIMUM EMERGENCY OIL SUPPLY DEVICE

BACKGROUND OF THE INVENTION

The present invention relates to a system for lubricating mechanical members, particularly aircraft drive components.

Mechanical drives, particularly those used on aircraft, require oil lubrication for reducing friction between moving parts (e.g. gears, splined couplings, bearings, dynamic seals) and, consequently the amount of mechanical energy converted by friction into thermal energy, and for dissipating said thermal energy for preventing the parts from overheating.

In most cases, lubrication failure results in rapid wear and permanent damage of mechanical components, due to overheating, which impairs the effectiveness of the heat treatment, and the presence of increasing quantities of metal particles produced by abrasion.

To safeguard against such damage, the effects of which are often catastrophic, the customary practice adopted by the majority of aircraft designers is to oversize the systems. In the specific case in question, the lubricating system generally comprises at least an auxiliary pump alongside the main one, or an auxiliary circuit alongside the main circuit, the intake of which is conveniently located lower down in the oil tank, to compensate for a fall in the oil level as a result of leakage.

The obvious disadvantage of lubricating systems of the type briefly described above is that they are complex, cumbersome and heavy, the latter two characteristics of which pose serious problems when applied to aircraft design.

Moreover, as the auxiliary circuit is generally controlled by electrically operated valves, the efficiency of the system also depends on the efficiency of these valves.

SUMMARY OF THE INVENTION

The aim of the present invention is to provide a lubricating system for mechanical drive members, particularly aircraft drive components, designed to overcome the drawbacks typically associated with known systems of the aforementioned type.

With this aim in view, according to the present invention, there is provided a system for lubricating mechanical members, particularly aircraft drive components, said system presenting a main circuit comprising a main tank containing lubricating oil, at least a main pump connected to said main tank, means for supplying said lubricating oil to said members, at least a delivery pipe connecting said pump to said supply means, means for recovering said lubricating oil subsequent to lubrication of said members, and means for recirculating said oil to said main tank; and an emergency device for ensuring at least a minimum supply of lubricating oil to at least some of said supply means in the event of a breakdown on said main circuit; characterised by the fact that said emergency device comprises a storage tank series-connected to said delivery pipe; means for intercepting oil flow along said delivery pipe to and from said storage tank; at least an auxiliary pump connected to said storage tank; an auxiliary delivery pipe for connecting said auxiliary pump to said supply means; and first distributing means for selectively connecting said recovery means to said recirculating means to said main tank, or to said storage tank.

BRIEF DESCRIPTION OF THE DRAWINGS

A preferred non-limiting embodiment of the present invention will be described by way of example with reference to the accompanying drawing, in which.

DETAILED DESCRIPTION OF THE INVENTION

Figure 1:
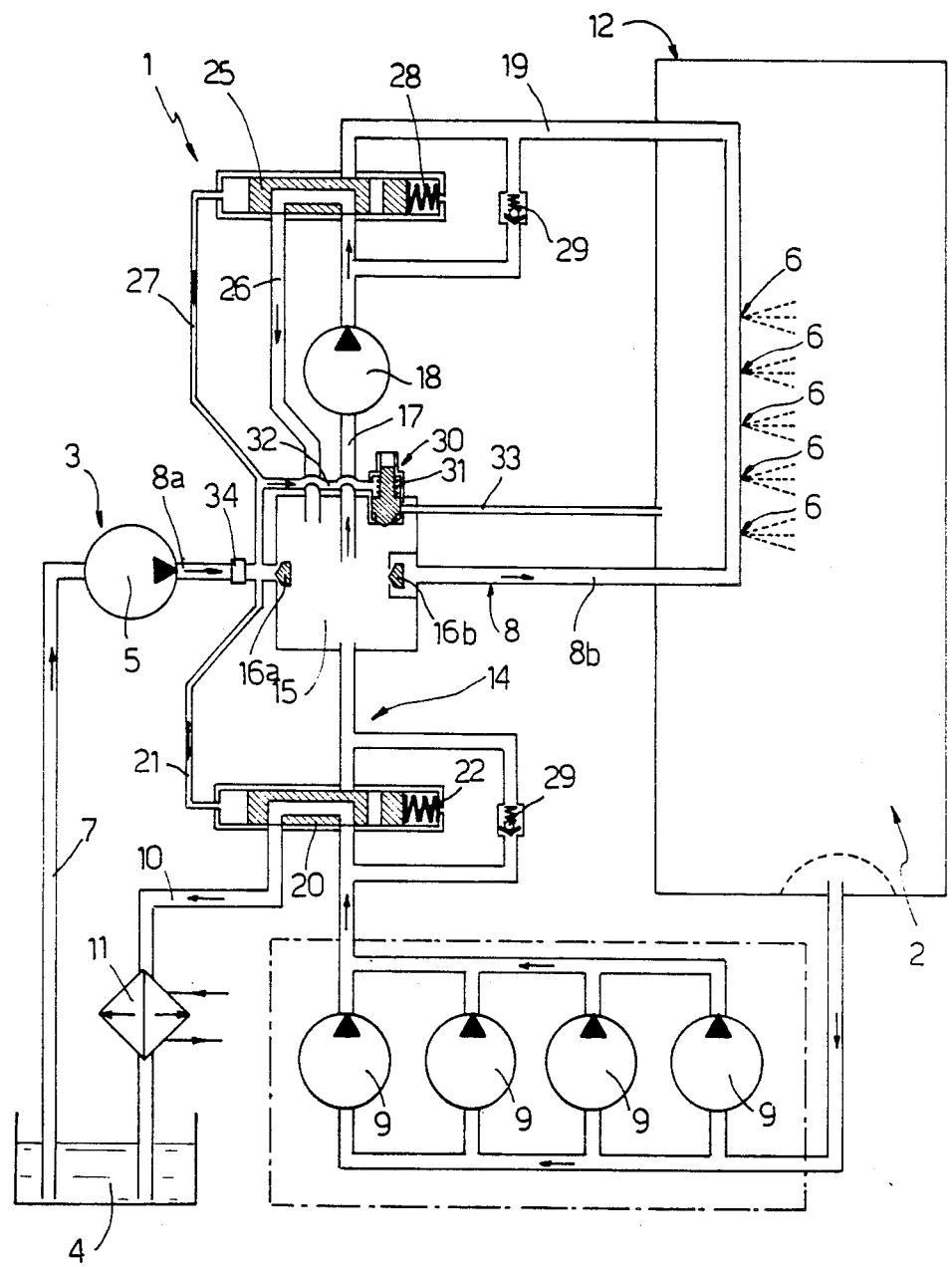
FIG. 1 shows a hydraulic diagram of a lubricating system in accordance with the present invention under normal operating conditions.
Figure 2:
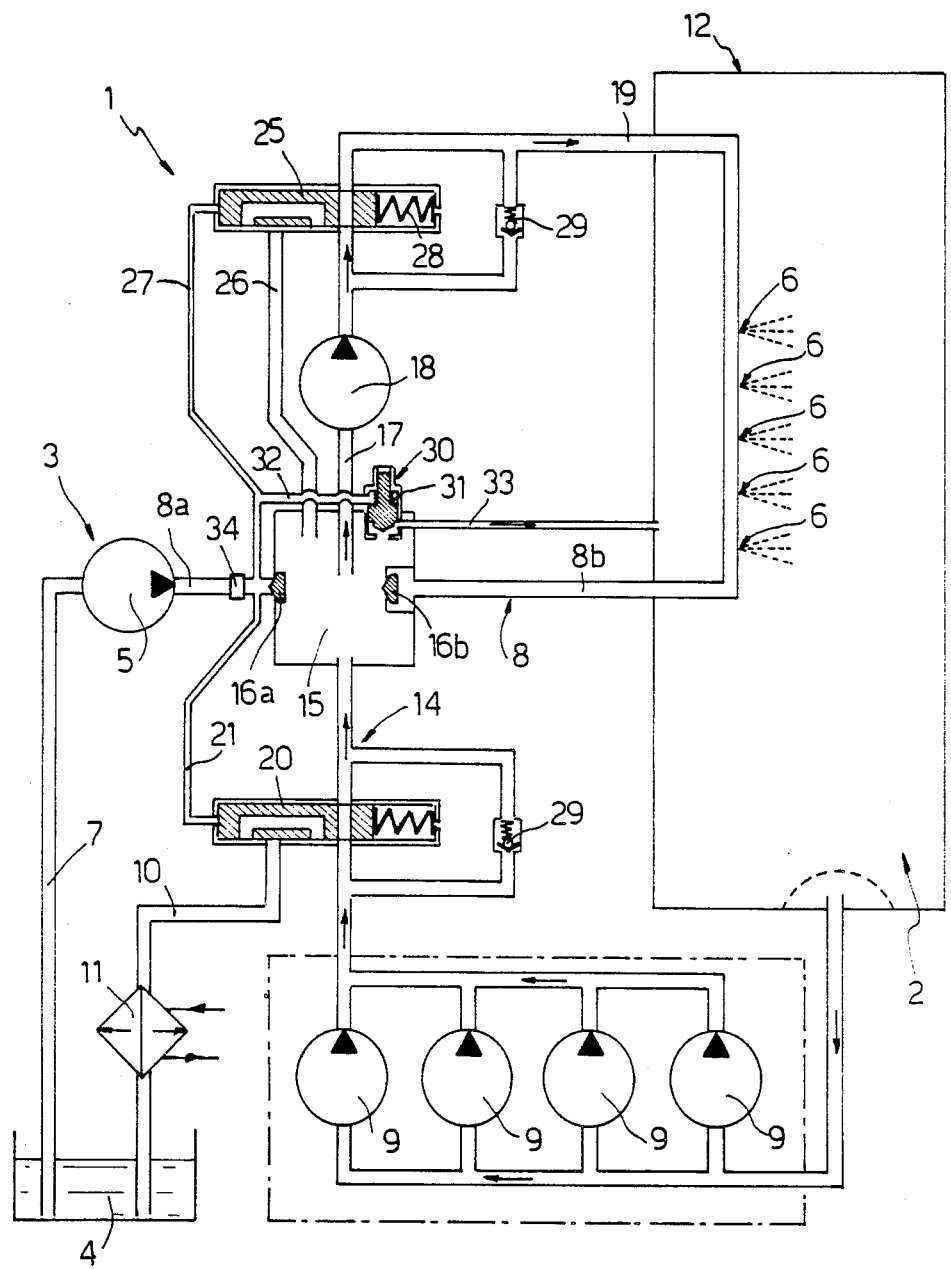
FIG. 2 shows a hydraulic diagram of the FIG. 1 system under emergency operating conditions.

Number 1 in FIGS. 1 and 2 indicates a system for lubricating an aircraft mechanical drive unit 2. Said unit 2 comprises an outer casing 12 housing a number of mechanical members of any known type (not shown) comprising moving parts such as gears, bearings and splined couplings requiring lubrication for ensuring troublefree operation and preventing rapid wear.

System 1 comprises a known type of main circuit 3 substantially consisting of a main tank 4; a main pump 5; a number of nozzles 6 so located inside drive unit 2 as to supply said mechanical members with a convenient amount of lubricating oil; an intake pipe 7 connecting main pump 5 to main tank 4; and a delivery pipe 8 connecting pump 5 to nozzle 6.

Main circuit 3 also comprises a number of parallel recovery pumps 9 for retrieving the oil from unit 2, subsequent to lubrication of said mechanical members, and feeding it to a pipe 10 by which it is fed back to main tank 4. Series-connected to said recirculating pipe 10, provision is made for a heat exchanger 11 by which the oil is cooled.

System 1 also presents an emergency device indicated as a whole by 14.

According to the present invention, said emergency device 14 substantially comprises a storage tank 15 series-connected to delivery pipe 8, which is thus divided into a first and second portion 8a, 8b up- and downstream respectively from tank 15. Said portion 8a and 8b are respectively connected to the inlet and outlet of tank 15 via the interposition of respective non-return valves 16a and 16b, which permit oil supply from main pump 5 to nozzles 6 but not in the reverse direction.

Tank 15 is connected by an auxiliary intake pipe 17 to an auxiliary pump 18, which is also connected to nozzles 6 by an auxiliary delivery pipe 19. In particular, portion 8b of delivery pipe 8 and auxiliary delivery pipe 19 combine to define a loop circuit on system 1.

Emergency device 14 also comprises a first valve 20 connected to the delivery side of pumps 9, to recirculating pipe 10 and to storage tank 15. Valve 20 is a monostable, two-position type controlled hydraulically by a line 21 originating from portion 8a of delivery pipe 8. In a first of said positions (FIG. 1) activated by pressurized fluid in line 21, valve 20 connects pumps 9 to recirculating pipe 10. In a second of said positions (FIG. 2) maintained by built-in elastic means 22, valve 20 connects the delivery side of pumps 9 to storage tank 15.

A second valve 25 is connected to the delivery side of auxiliary pump 18, to auxiliary recirculating pipe 26 to storage tank 15, and to auxiliary delivery pipe 19. Valve 25, like valve 20, is a monostable, two-position type controlled hydraulically by a line 27 originating from portion 8a of delivery pipe 8. In a first of said positions (FIG. 1) activated by pressurized fluid in line 27, valve 25 connects auxiliary pump 18 to auxiliary recirculating pipe 26. In a second of said positions (FIG. 2) maintained by built-in elastic means 28, valve 25 connects the delivery side of auxiliary pump 18 to auxiliary delivery pipe 19.

For protection against high pressure peaks, valves 20 and 25 are connected parallel to respective known by-pass valves 29.

Portion 8a of delivery pipe 8 presents a pressure sensor 34 connected in use to low pressure indicating means (not shown), e.g. an indicator light in the cockpit. Emergency device 14 also comprises an overpressure valve 30 on storage tank 15, which valve 30 is normally maintained closed by the combined action of built-in elastic means 31 and the oil pressure in control line 32 originating from line 27 and therefore subjected to the same pressure as portion 8a of delivery pipe 8. Overpressure valve 30 is connected to a vent pipe 33 inside casing 12 of unit 2.

Operation of system 1 is as follows.

Under normal operating conditions, the oil from main pump 5 pressurizes portions 8a of delivery pipe 8, opens non-return valve 16a, flows through storage tank 15, opens non-return valve 16b, and flows along portion 8b of delivery pipe 8 to nozzles 6.

Via lines 21 and 27, the pressure of the oil in portion 8a overcomes the resistance of elastic means 22 and 28 of valves 20 and 25, so as to set the latter to said first position shown in FIG. 1.

The used lubricating oil is thus retrieved by pumps 9 and fed through valve 20 to heat exchanger 11 and, from there, to tank 4. In this configuration, auxiliary pump 18 performs no practical function, and provides merely for recirculating part of the oil in tank 15 through pipes 17 and 26.

Via control line 32, the pressure of the oil in portion 8a also provides, in conjunction with elastic means 31, for maintaining overpressure valve 30 closed.

In the event of a breakdown on main circuit 3, e.g. failure of main pump 5, exchanger 11 or any one of the pipes, the pressure in portion 8a is removed, and the system switches automatically to the emergency status shown in FIG. 2.

This is detected by sensor 34 which activates said indicating means; non-return valve 16a closes; valves 20 and 25 switch to the position imposed by elastic means 22 and 28; and overpressure valve 30, relieved of the hydraulic pressure provided by line 32, is allowed to open.

Auxiliary pump 18 therefore sucks up the oil in storage tank 15 and feeds it to auxiliary delivery pipe 19 and nozzles 6. At the same time, non-return valve 16b closes by virtue of the pressure in portion 8b. The used lubricating oil is retrieved by pumps 9 and channelled by valve 20 to storage tank 15 for another cycle as already described.

As total supply by recovery pumps 9 is greater than that of auxiliary pump 18, the difference is disposed of by overpressure valve 30 via pipe 33, which provides for restoring the pressure balance between tank 15 and the inside of casing 12 of unit 2, thus preventing damage to tank 15.

Switching of the valves as described provides for isolating the fault on main circuit 3, and so ensuring minimum oil supply to unit 2 for safeguarding the mechanical components against the damage already mentioned. When normal pressure is restored in portion 8a, the system automatically reverts to the normal configuration shown in FIG. 1.

Figure 3:
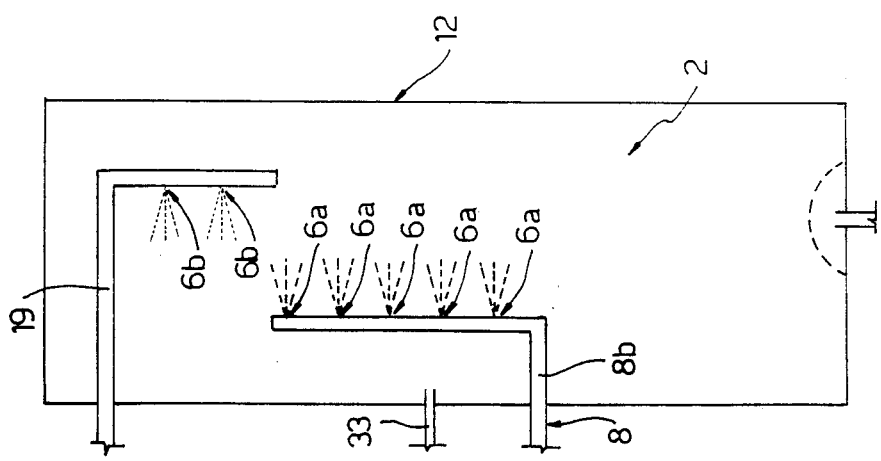
FIG. 3 shows a variation of a unit employing the FIG. 1 system.

FIG. 3 shows a variation in the arrangement and supply of nozzles 6 on unit 2.

In this case, delivery pipe 8 and auxiliary delivery pipe 19 are separated, pipe 8 providing for supplying a number of nozzles 6a for fully lubricating all the pertinent unit 2 members under normal operating conditions, and auxiliary pipe 19 for supplying a small number of auxiliary nozzles 6b for emergency lubrication, possibly at low pressure, of the critical components only, e.g. the bearings.

Figure 4:
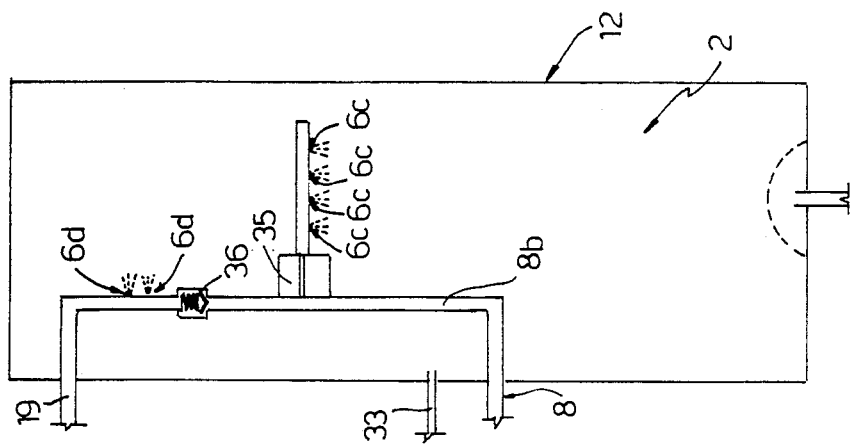
FIG. 4 shows a second variation of the FIG. 1 unit

In the FIG. 4 variation, delivery pipe 8 provides, via a pressure reducer 35, for supplying a number of nozzles 6c for lubricating less critical components requiring low-pressure lubrication and which may function without oil for a given length of time, e.g. the gears. Auxiliary pipe 19, on the other hand, provides for supplying a second number of nozzles 6d for lubricating critical components only.

Pipes 8 and 19 communicate via a non-return valve 36 enabling oil to flow from pipe 8 to pipe 19 (normal operating condition) but not vice versa (emergency condition).

Under normal operating conditions therefore, all the components are lubricated, whereas, in emergency status, valve 36 closes and nozzles 6c are cut off. The advantages of system 1 according to the present invention will be clear from the foregoing description. In particular, emergency device 14 ensures a minimum supply of lubricating oil to the components, or at least the most critical components, of unit 2, even in the event of a serious breakdown on main circuit 1. Moreover, system 1 is lightweight, by virtue of the small number of components employed, and highly reliable, by virtue of the oil supply being controlled exclusively by straightforward mechanical components (valves energized by elastic means and/or hydraulic controls).

No use is made of electrical or electronic actuators or controls which might further jeopardize the efficiency of the mechanical system which must be provided for in any case.

As regards sensor 34, it should be pointed out that this provides solely for detecting failure of main circuit 3, and performs no control function in connection with emergency device 14.

To those skilled in the art it will be clear that changes may be made to system 1 as described and illustrated herein without, however, departing from the scope of the present invention. For example, emergency device 14 may comprise a filter, a heat exchanger and/or a deaerator between valve 20 and storage tank 15; and provision may also be made for overpressure valves on pipes 19 and, in the FIG. 3 variation, on pipes 8b and 19.

What is claimed:

1. A system for lubricating mechanical members, particularly aircraft drive components, said system presenting a main circuit comprising a main tank containing lubricating oil, at least a main pump connected to said main tank, supply means for supplying said lubricating oil to said members, at least a delivery pipe connecting said pump to said supply means, means for recovering said lubricating oil subsequent to lubrication of said members, and recirculating means for recirculating said oil to said main tank; and an emergency device for ensuring at least a minimum supply of lubricating oil to at least some of said supply means in the event of a breakdown on said main circuit; characterised by the fact that said emergency device (14) comprises a storage tank (15) series-connected to said delivery pipe (8); intercepting means (16a, 16b) for intercepting oil flow along said delivery pipe (8) to and from said storage tank (15); at least an auxiliary pump (18) connected to said storage tank (15); an auxiliary delivery pipe (19) for connecting said auxiliary pump (18) to said supply means (6; 6b; 6d); and first distributing means (20) for selectively connecting said recovery means (9) to said recirculating means (10) to said main tank (4), or to said storage tank (15).

2. A system claimed in claim 1, characterised by the fact that said first distributing means comprise a two-position valve (20), one of which positions is maintained by oil pressure in a control line (21) originating from said delivery pipe (8a) upstream from said storage tank (15), and connects said recovery means (9) to said recirculating means (10), and the other of which positions is maintained by elastic means (22) in absence of said oil pressure, and connects said recovery means (9) to said storage tank (15).

3. A system as claimed in claim 1, characterised by the fact that said emergency device (14) comprises second distributing means for selectively connecting said auxiliary pump (18) to said auxiliary delivery pipe (19) or to an auxiliary recirculating pipe (26) to said storage tank (15).

4. A system as claimed in claim 3, characterised by the fact that said second distributing means comprise a two-position valve (25), one of which positions is maintained by the oil pressure in a control line (27) originating from said delivery pipe (8a) upstream from said storage tank (15), and connects said auxiliary pump (18) to said auxiliary recirculating pipe (26), and the other of which positions is maintained by elastic means (28) in the absence of said pressure, and connects said auxiliary pump (18) to said auxiliary delivery pipe (19).

5. A system as claimed in claim 1,
characterised by the fact that said emergency device (14) comprises an overpressure valve (30) located between said storage tank (15) and a vent pipe (33) communicating with the inside of a casing (12) housing said mechanical members.

6. A system as claimed in claim 5, characterised by the fact that said overpressure valve (30) is closed by the oil pressure in a line (32) connected to said delivery pipe (8a) upstream from said storage tank (15).

7. A system as claimed in claim 1,
characterised by the fact that said oil flow intercepting means comprise a pair of non-return valves (16a, 16b) enabling oil flow from said main pump (5) to said supply means (6; 6a; 6c) but not in the reverse direction.

8. A system as claimed in claim 1,
characterised by the fact that said supply means comprise a number of nozzles (6: 6a; 6b; 6c, 6d).

9. A system as claimed in claim 1,
characterised by the fact that said delivery pipe (8) and said auxiliary delivery pipe (19) are connected to each other.

10. A system as claimed in claim 1,
characterised by the fact that said delivery pipe (8) and said auxiliary delivery pipe (19) are connected by a non-return valve (36) enabling oil flow from said delivery pipe (8) to said auxiliary delivery pipe (19) but not in the reverse direction.

11. A system as claimed in claim 1,
characterised by the fact that said delivery pipe (8) and said auxiliary delivery pipe (19) are separate.

12. A system as claimed in claim 10 characterised by the fact that said supply means comprise a first number of nozzles (6a; 6c) supplied by said delivery pipe (8), and a second number of nozzles (6b; 6d) supplied by said auxiliary delivery pipe (19).

* * * * *

UNITED STATES PATENT AND TRADEMARK OFFICE
CERTIFICATE OF CORRECTION

PATENT NO.   :   4,976,335

DATED        :   December 11, 1990

INVENTOR(S)  :   Bruno Cappellato

It is certified that error appears in the above-identified patent and that said Letters Patent is hereby corrected as shown below:

On the title page: ITEM [22]

Filing Date should be

--February 12, 1990--.

Signed and Sealed this

Sixteenth Day of August, 1994

*Attest:*

BRUCE LEHMAN

*Attesting Officer*           *Commissioner of Patents and Trademarks*